United States Patent
Thia et al.

(10) Patent No.: US 6,563,661 B2
(45) Date of Patent: May 13, 2003

(54) DRIVE-LEVEL BEARING FRICTION MEASUREMENT METHOD

(75) Inventors: Terang KongBeng Thia, Singapore (SG); Joseph HengTung Lau, Singapore (SG); Stephen KowChiew Kuan, Singapore (SG); Jeffrey SoonBeng Sim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 247 days.

(21) Appl. No.: 09/773,972

(22) Filed: Jan. 31, 2001

(65) Prior Publication Data

US 2001/0030826 A1 Oct. 18, 2001

Related U.S. Application Data

(60) Provisional application No. 60/181,027, filed on Feb. 8, 2000.

(51) Int. Cl.$^7$ .......................... G11B 21/02; G11B 15/18; G01R 33/12; G01N 3/56
(52) U.S. Cl. .......................... 360/75; 360/69; 324/212; 73/9
(58) Field of Search .............................. 360/31, 55, 69, 360/75, 78.01, 78.04, 78.08, 98.06, 98.07, 99.04, 99.08, 250, 260, 270; 73/9; 324/212

(56) References Cited

U.S. PATENT DOCUMENTS

| | | | |
|---|---|---|---|
| 3,685,342 A | | 8/1972 | Gordon |
| 4,065,956 A | | 1/1978 | Trattner et al. |
| 4,763,923 A | | 8/1988 | Raidel |
| 4,963,508 A | | 10/1990 | Umeno et al. |
| 5,319,509 A | * | 6/1994 | Michelson et al. ...... 360/77.03 |
| 5,615,064 A | * | 3/1997 | Blank et al. .................. 360/75 |
| 6,324,890 B1 | * | 12/2001 | Yeo et al. ........................ 73/9 |
| 6,453,722 B1 | * | 9/2002 | Liu et al. ........................ 73/9 |

* cited by examiner

Primary Examiner—Andrew L. Sniezek
(74) Attorney, Agent, or Firm—David K. Lucente; Derek J. Berger

(57) ABSTRACT

A preferred system for measuring bearing friction first measures voice coil motor current values required to move an actuator arm assembly to each of several cylinder position intervals. Torque values required to move the actuator arm assembly are then computed using the measured voice coil motor currents. Drive-level bearing friction values are then calculated using the computed torque values and then combined into a composite indicator.

17 Claims, 5 Drawing Sheets

DRIVE-LEVEL BEARING FRICTION MEASUREMENT METHOD

RELATED APPLICATION

This application claims the benefit of U.S. Provisional Application Serial No. 60/181,027, filed Feb. 8, 2000 under 35 U.S.C. 119(e).

FIELD OF THE INVENTION

The present invention relates to the field of mass storage devices. More particularly, this invention relates to a system and method for measuring drive-level bearing friction.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator arm assembly including the transducer moves the transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider that is aerodynamically designed so that it flies over the disc. The slider is passed over the disc in a transducing relationship with the disc. Most sliders have an air-bearing surface (ABS) which includes rails and a cavity between the rails. When the disc rotates (typically at rotational speeds of 10,000 RPM or higher), air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring, which produces a force on the slider directed toward the disc surface. The various forces on the slider equilibrate, so that the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of the disc drive. Each track on a disc surface in a disc drive is further divided into a number of short arcs called sectors. Servo feedback information is used to accurately locate the transducer head onto the tracks/sectors. The actuator arm assembly is moved to the required position and held very accurately during a read or write operation using the servo information.

The actuator arm assembly is rotatably attached to a shaft via a bearing cartridge, which typically includes one or more sets of ball bearings. The shaft/post is attached to the base and may be attached to the top cover of the disc drive. A yoke is attached to the actuator arm assembly. The voice coil is attached to the yoke at one end of the rotary actuator arm assembly. The voice coil is part of a voice coil motor, which is used to rotate the actuator arm assembly including the attached transducer or transducers. A permanent magnet is attached to the base and cover of the disc drive. The voice coil motor, which drives the rotary actuator arm assembly, comprises the voice coil and the permanent magnet. The voice coil is attached to the rotary actuator arm assembly and the permanent magnet is fixed on the base. A yoke is typically used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Tribological qualifications of the head-disc interface (head-actuator arm-shaft-bearing cartridge-disc interface) is generally a critical path to final qualification of the both the head and the disc during the design and development stages of new disc drives. This is because, the bearing cartridge is the only dynamic structure holding between the actuator arm assembly and the base in a disc drive. Generally, too much bearing friction in the bearing cartridge can cause seeking and settling problems in the actuator arm assembly, and too little bearing friction in the bearing cartridge can cause oscillations in the actuator arm assembly during track following. Therefore, it is critical to be able to characterize the drive-level bearing friction during disc drive qualifications. Current methods to measure bearing friction are performed at a component level using a dedicated bearing cartridge torque tester. Measuring bearing friction at the component level is a static bearing friction measurement. These static measurements generally do not reveal true drive-level bearing friction (dynamic bearing friction developed during operation of the disc drive). This is because relative position and loading conditions of the ball bearing raceways will be different in the disc drive during operation of the disc drive. Therefore, current methods using component level bearing friction measurements do not measure true dynamic bearing friction (drive-level bearing friction). Also, knowing drive-level bearing friction helps in better characterizing the bearing and further aids in analyzing problem disc drives.

What is needed is a system and method to measure bearing friction of a disc drive during operation of the disc drive that aids in effectively evaluating the disc drives.

SUMMARY OF THE INVENTION

In a first preferred embodiment, a disc drive includes a base and a disc rotatably attached to the base. The disc drive also includes a shaft attached to the base. A bearing cartridge is disposed in the base. An actuator arm assembly is attached to the shaft via the bearing cartridge such that the actuator arm assembly is in an actuating relationship with respect to the disc. The disc drive further includes a voice coil motor. The voice coil motor is coupled to the actuator arm assembly to position the actuator arm assembly including a transducer head over the rotating disc during track follow-and-seek operations of the disc drive. The voice coil motor is further coupled to a disc drive controller to control the movement of the actuator arm assembly. The disc drive controller includes a servo controller, an analyzer, a comparator, and a memory.

In a second preferred embodiment, the servo controller through the voice coil motor moves the actuator arm assembly to predetermined cylinder position intervals from an outermost cylinder position to an innermost cylinder position on the rotating disc. Then the servo controller measures the voice coil motor current required to move the actuator arm assembly to each of the predetermined cylinder position intervals. Then the servo controller further moves the actuator arm assembly to the predetermined cylinder position intervals from the innermost cylinder position to the outermost cylinder position on the rotating disc with an increment cylinder set by the user. Then the servo controller again measures the voice coil motor current required to move the actuator arm assembly to each of the predetermined cylinder position intervals.

In a third preferred embodiment, the analyzer then computes torque values required to move the actuator arm assembly to each of the predetermined cylinder position intervals using the measured voice coil motor currents. Then the analyzer computes drive-level bearing friction values to move the actuator arm assembly to each of the predetermined cylinder position intervals using the computed torque values. The analyzer further computes an average drive-level bearing friction value from the computed drive-level bearing friction values to determine the drive-level bearing friction of the disc drive. The comparator coupled to the analyzer compares the determined drive-level bearing friction with a predetermined drive-level bearing friction value to characterize the disc drive.

A fourth preferred embodiment is a method of measuring drive-level bearing friction and characterizing the disc drive using the measured drive-level bearing friction. The method begins with the step of measuring voice coil motor current values for moving an actuator arm assembly from an outermost cylinder position to each predetermined cylinder position interval until the actuator arm assembly reaches the innermost cylinder position. The method further requires measuring voice coil motor current values for moving the actuator arm assembly from the innermost cylinder position to each of the predetermined cylinder intervals until the actuator arm assembly reaches the outermost cylinder position.

A fifth embodiment comprises computing torque values required to move the actuator arm assembly to each of the predetermined cylinder position intervals from the measured voice coil motor currents. Then the method requires computing drive-level bearing friction values using the computed torque values. Then the method further requires computing an average drive-level bearing friction from the computed drive-level bearing friction values to determine the drive-level bearing friction of the disc drive. Next, the method comprises comparing the determined average drive-level bearing friction to a predetermined drive-level bearing friction to characterize the disc drive.

Further features and advantages of the present invention will become apparent upon a review of the following figures and their accompanying detailed description.

DETAILED DESCRIPTION

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable.

Figure 1:
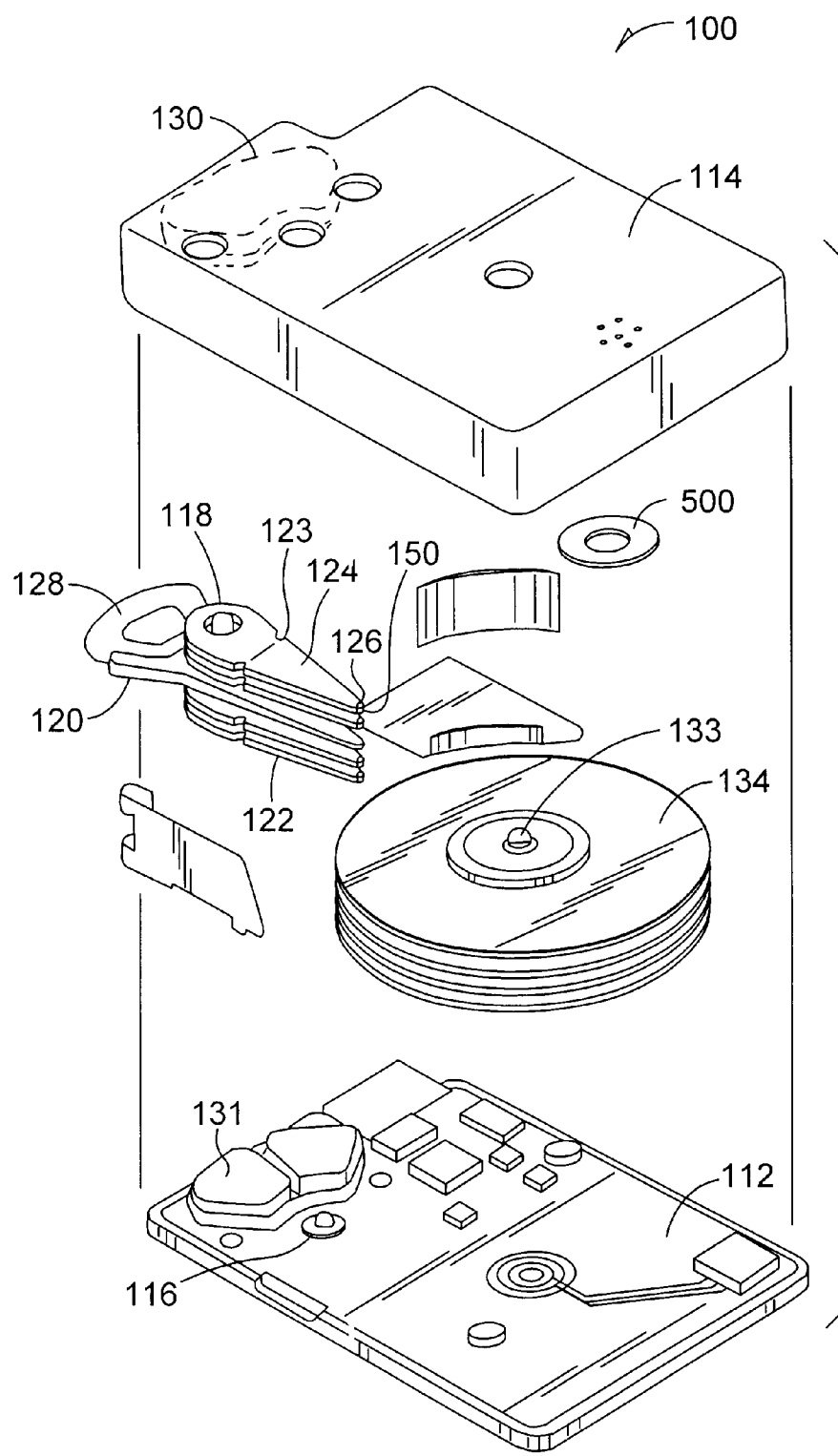
FIG. 1 is an exploded view of a disc drive with a multiple disc stack.

FIG. 1 is an exploded view of one type of a disc drive 100 having a rotary actuator. The disc drive 100 includes a housing or a base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126, which carries a magnetic transducer 150. The slider 126 with the transducer 150 form what is many times called the head. It should be noted that generally sliders have one transducer 150 and that is what is shown in the figures. It should also be noted that this invention is equally applicable to sliders having more than one transducer, such as what is referred to as an MR or magneto resistive head in which one transducer 150 is typically used for reading and another is typically used for writing. On the end of the actuator arm assembly 120, opposite the load springs 124 and the sliders 126, is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor, which applies a force to the actuator assembly 120 to rotate it about the actuator shaft 118 mounted on a bearing cartridge 116. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a recording surface 135. Only one disc 134 is numbered for the sake of clarity. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors, which are within the hub 133 or under the hub. The disc drive also includes a printed circuit card 170, which is attached to the base 112 of the disc drive 100. The printed circuit card 170 includes a controller 180 and random access memory 182, which the controlled accesses to control various aspects of the disc drive. One aspect of the disc drive controlled of interest is the control of the interface between a host computer and the disc drive and more specifically, the control of mapping logical block addresses to physical sector locations on a particular disc 134.

Figure 2:
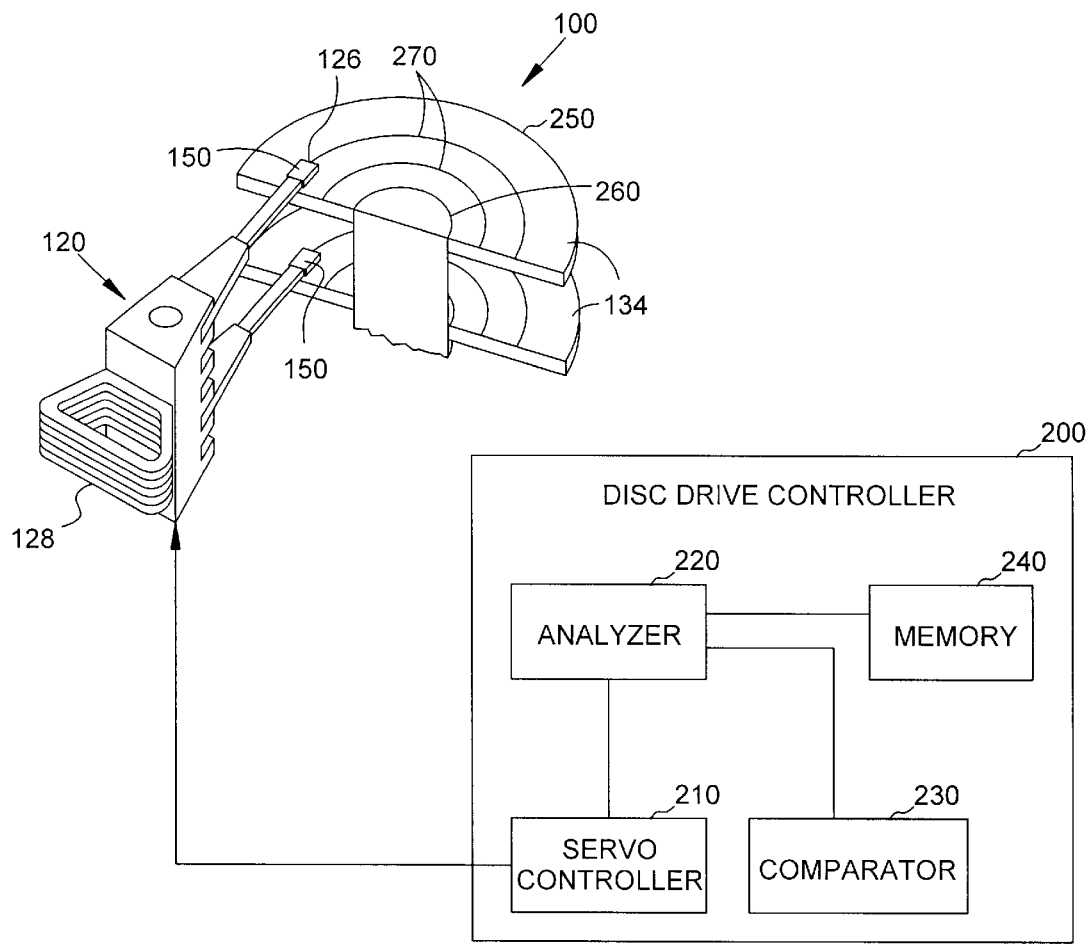
FIG. 2 is a cut-away view of an actuator arm assembly along with discs of the disc drive shown in FIG. 1, and a block diagram showing portions of the disc drive controller used in the present invention.

Referring now to FIG. 2, there is shown a cutaway view of the actuator arm assembly 120, the voice coil 128, and the one or more discs 134 of the disc drive 100 shown in FIG. 1. The actuator arm assembly 120 includes one or more transducers 150 and its respective sliders 126. As shown in FIG. 2, the actuator arm assembly 120 is in an actuating relationship with respect to the one or more discs 134. Also shown in FIG. 2, is a block diagram of a disc drive controller 200 and its major components according to the teachings of the present invention. The disc drive controller 200 includes a servo controller 210. The servo controller 210 is coupled to the voice coil 128 of a voice coil motor. The servo controller 210 controls the movement of the actuator arm assembly 120 including the transducer head/slider 150/126 during track follow-and-seek operations of the disc drive 100 through the voice coil 128. The disc drive controller 200 further includes an analyzer 210, a comparator 230, and an optional memory 240.

In operation, the servo controller 210 moves the actuator arm assembly 120 to predetermined cylinder position intervals 270 from an outermost cylinder position 250 to an innermost cylinder position 260 on the rotating disc 134 and measures the voice coil motor current required to move the actuator arm assembly 120 to each of the predetermined cylinder position intervals. Then the servo controller 210, further moves the actuator arm assembly 120 to the predetermined cylinder position intervals 270 from the innermost cylinder position 260 to the outermost cylinder position 250 and measures the voice coil motor current required to move the actuator arm assembly 120 to each of the same predetermined cylinder position intervals.

Figure 3:
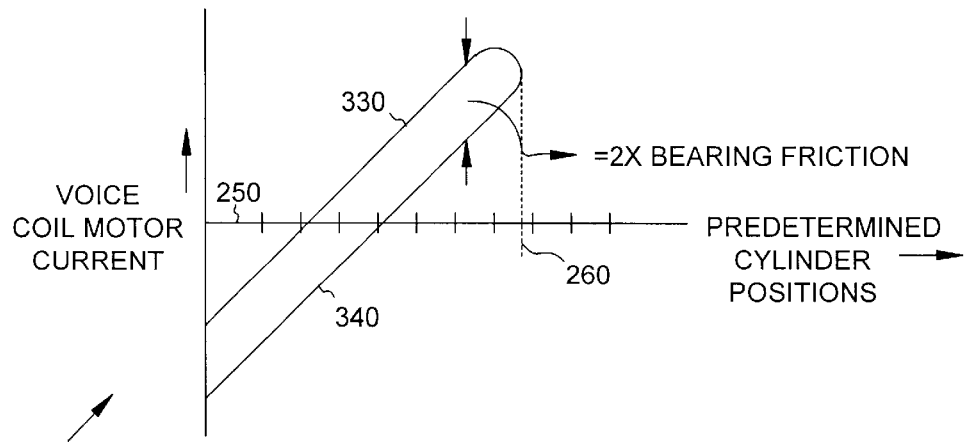
FIG. 3 is a schematic illustrating the forces experienced by the actuator arm assembly when traveling from an outermost diameter to an innermost diameter of the disc drive shown in FIG. 1.

FIG. 3 illustrates graphically the measured voice coil motor current versus the predetermined cylinder position intervals according to the teachings of the present invention. The graph in FIG. 3 illustrates the measured voice coil motor current 330 required to move the actuator arm assembly 120 to each of the predetermined cylinder interval positions from the outermost cylinder position 250 to the innermost cylinder position 260. Also, the graph in FIG. 3 illustrates the voice coil motor current 340 required to move the actuator arm assembly 120 to each of the predetermined cylinder interval positions from the innermost cylinder position 260 to the outermost cylinder position 250. It can be seen from the graph shown in FIG. 3 that the voice coil motor current 330 required to move the actuator arm assembly 120 from the outermost to the innermost cylinder position is more than the voice coil motor current 340 required to move the actuator arm assembly 120 from the innermost to the outermost cylinder position. This difference in the voice coil motor current is due to a presence of friction in the bearing cartridge 116. The difference in the voice coil motor current is two times the bearing friction. Also, it can be seen from the graph illustrated in FIG. 3 that the difference in the voice coil motor current is fairly constant when the actuator arm assembly is moved from the outermost cylinder position to the innermost cylinder position, indicating that the bearing friction is fairly constant over the entire range. It can be envisioned that a smaller difference in the voice coil motor current indicates a lower bearing friction and a larger difference in the voice coil motor current indicates a higher bearing friction. Also, a variation in the difference in the voice coil motor current between the innermost to outermost cylinder positions indicates that the bearing friction is changing at each of the predetermined cylinder intervals.

Next, the analyzer 220 coupled to the servo controller 210 computes torque values required to move the actuator arm assembly 120 to each of the predetermined cylinder position intervals when moving the actuator arm assembly from the innermost to the outermost and the outermost to the innermost cylinder positions. In some embodiments, the analyzer 220 computes the torque values by multiplying the measured voice coil motor currents with a predetermined torque constant. The details of the computation of the torque values used by the analyzer 220 are discussed below.

Figures 4, 5:
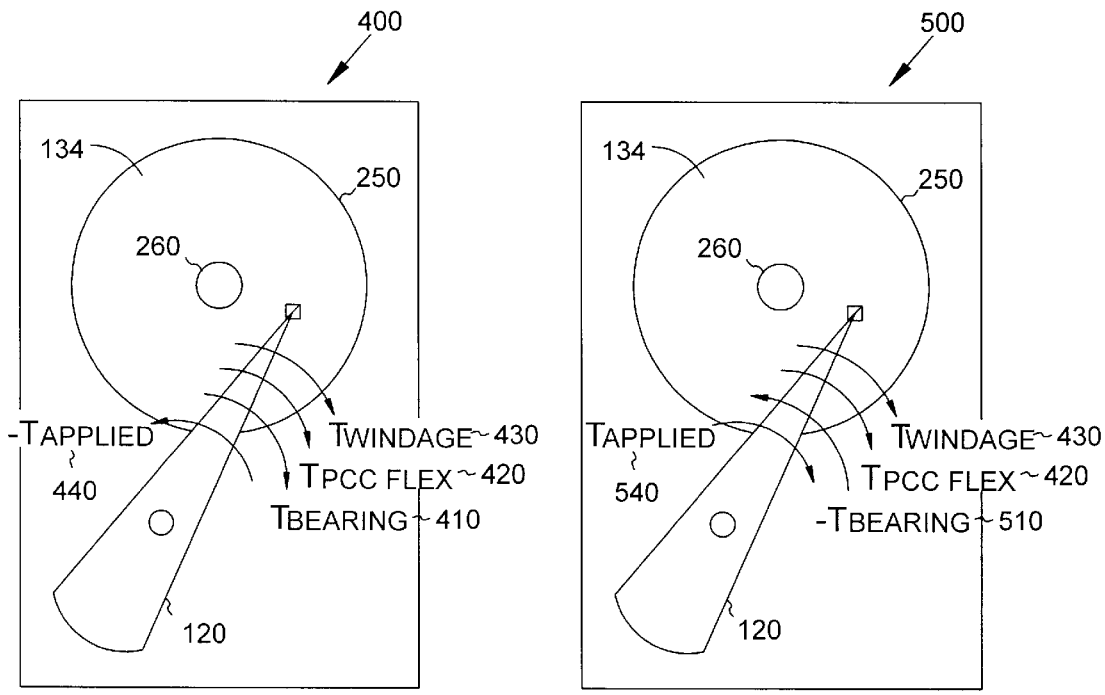
FIG. 4 is a schematic illustrating forces experienced by the actuator arm assembly when traveling from the innermost diameter to the outermost diameter of the disc drive shown in FIG. 1.
FIG. 5 is a graph illustrating the drive-level bearing friction measurement according to the present invention.

FIGS. 4 and 5 illustrate forces experienced by an actuator arm assembly, when the actuator arm assembly is moved from the outermost to innermost cylinder positions 400, and the innermost to outermost cylinder positions 500. It can be seen from FIGS. 4 and 5 that the actuator arm assembly typically has to overcome bearing friction forces 410 and 510, printed circuit cable bias force 420, and windage force 430. The bearing friction forces 410 and 510 are generated due to a friction present in the bearing cartridge 116. The bearing friction forces 410 and 510 are generated during the actuator arm assembly being moved from the outermost to innermost cylinder positions and the innermost to outermost cylinder positions, respectively. The bearing friction forces 410 and 510 are different because the direction of bearing friction forces generated are opposite from each other, and this necessitates applying a positive voice coil motor current in one direction (when the actuator arm assembly 150 moves from the outermost to innermost cylinder positions) and a negative voice coil motor current in the other direction (when the actuator arm assembly 150 moves from the innermost to outermost cylinder positions).

The printed circuit cable bias force is generated due to a typically necessary twist or loop present in the printed circuit cable to provide a mechanical linkage via the copper traces for the electrical signal to be transmitted from the transducer head 150 to the servo controller 210. This twist or loop in the printed circuit cable typically has a tendency to flex, and this tendency to flex generates a bias force towards the outermost cylinder position.

The windage force is generated due to the rotating disc 134. Typically the disc 134 rotates at a very high speed, and this high-speed rotation by the disc 134 generates strong windage, this strong windage developed during the high-speed rotation of the disc 134 has a tendency to push the actuator arm assembly 150 towards the outermost cylinder position.

The following equations illustrate the various torques required by the voice coil motor to move the actuator arm assembly 150 from the outermost to the innermost cylinder position and from the innermost to the outermost cylinder position, respectively.

$$-T_{Applied} = T_{Bearing\ friction} + T_{PCC\ Flex} + T_{Windage}$$

$$T_{Applied} = -T_{Bearing\ friction} + T_{PCC\ Flex} + T_{Windage}$$

Where the $-T_{Applied}$ is the torque applied by the voice coil motor to move the actuator from the outermost to the innermost cylinder position, the $T_{Applied}$ is the torque applied by the voice coil motor to move the actuator from the innermost to the outermost cylinder position, the $-T_{Bearing\ friction}$ is the torque applied by the voice coil motor to overcome the bearing friction present in the bearing cartridge 116 when moving the actuator arm assembly 150 from the outermost to the innermost cylinder position, the $T_{Bearing\ friction}$ is the torque applied by the voice coil motor to overcome the bearing friction in the bearing cartridge 116 when moving the actuator arm assembly 150 from the innermost to the outermost cylinder position, the $T_{PCC\ Flex}$ is the torque applied by the voice coil motor to overcome the printed circuit cable bias force, and the $T_{Windage}$ is the torque applied by the voice coil motor to overcome the windage force generated by the high-speed rotation of the disc 134.

Next, the analyzer 220 computes drive-level bearing friction values to move the actuator arm to each of the predetermined cylinder position intervals using the torque values computed by using the above two equations. In some embodiments, the analyzer 220 computes the drive level bearing friction values for each of the cylinder positions by subtracting the above two equations to separate the torque required by the voice coil motor to overcome the bearing friction in the bearing cartridge 116 from the torque required by the voice coil motor to overcome the printed circuit cable bias and the windage forces for each of the predetermined cylinder intervals. The subtraction of the above two equations, yields two times the torque required to overcome the bearing friction in the bearing cartridge 116 (2 $T_{Applied}$, is the summation of the torque applied to overcome the bearing friction when the actuator arm is moved from the outermost to innermost and the innermost to outermost cylinder positions). Therefore, the graph in FIG. 3 shows two times the voice motor current required by the voice coil motor to overcome the bearing friction at each of the cylinder positions. Then the analyzer computes the drive-level bearing friction values by obtaining half of the separated torque values associated with the bearing friction.

Next, the analyzer 220 computes an average drive-level bearing friction value from the computed drive-level bearing friction values to determined the drive-level bearing friction value for a bearing cartridge 116 of the disc drive. In some embodiments, the analyzer 220 computes the average drive-level bearing friction value by summing (curve fitting the plot in FIG. 3) all of the computed drive-level bearing friction values and dividing the obtained sum of the computed drive-level bearing friction value by a number of the predetermined cylinder interval positions (the difference of the interception of the two lines 330 and 340 on y-axis is the average bearing friction). In some embodiments, the number of the predetermined cylinder interval positions also includes the inner and outermost cylinder positions.

In some embodiments, the comparator 230 coupled to the analyzer 220 compares the determined drive-level bearing friction with a predetermined drive-level bearing friction value to characterize the disc drive 100. In some embodiments, the disc drive controller 200 stores the torque constant and the predetermined cylinder position intervals in the memory 240. It can also be envisioned that the disc drive controller 200 can provide a capability to enter desired predetermined cylinder position intervals to determine the drive-level bearing friction.

Figure 6:
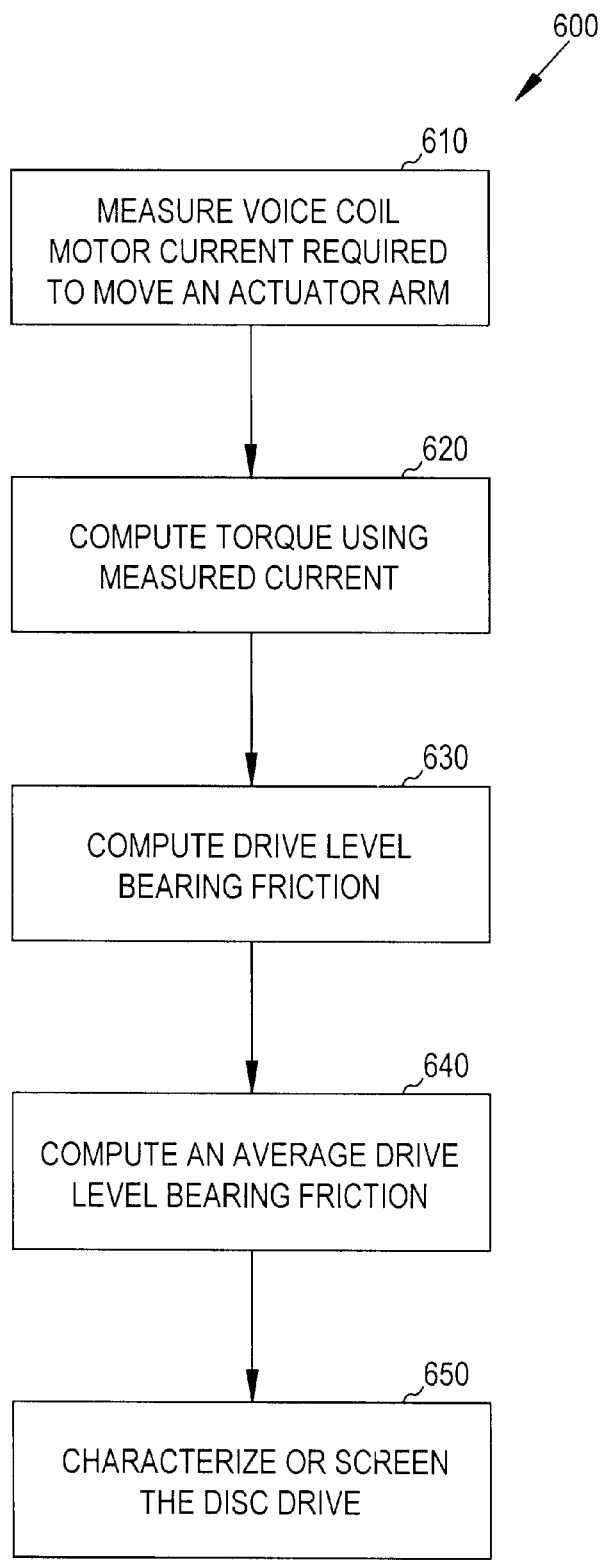
FIG. 6 is a flow diagram of a method of measuring drive-level bearing friction according to the present invention.

FIG. 6 illustrates a flow diagram of a method 600 of measuring drive-level bearing friction of a disc drive. In this example embodiment shown in FIG. 6, the first step 610 in the process includes measuring voice coil motor current values required to move an actuator arm assembly from an outermost cylinder position to each predetermined cylinder position interval until the actuator arm assembly reaches an innermost cylinder position. In some embodiments, the measuring of the voice coil motor current values also includes measuring voice coil motor current values required to move the actuator arm assembly to the outermost and innermost cylinder positions.

Also, the step 610 further includes measuring voice coil motor current values required to move the actuator arm assembly from the innermost cylinder position to each of the predetermined cylinder intervals until the actuator arm assembly reaches the outermost cylinder position. In some embodiments, the measuring of the voice coil motor current values also includes measuring voice coil motor current values required to move the actuator arm assembly to the innermost to outermost cylinder positions. In some embodiments, the predetermined cylinder position intervals are not more than 100 cylinder positions.

Next, the method 600 includes the step 620 of computing torque values required to move the actuator arm to each of the predetermined cylinder position intervals using the measured voice coil motor currents. This step 620 includes computing torque values for moving the actuator arm to each of the predetermined cylinder position intervals from the outermost to innermost and the innermost to outermost cylinder position intervals. In some embodiments, the torque values are computed by multiplying the measured voice coil motor current values with a torque constant to obtain the torque values required to move the actuator arm assembly to each of the predetermined cylinder position intervals. The computation of the torque values is discussed in more detail in the detailed description of FIGS. 3, 4, and 5.

Next, the process 600 includes step 630 of computing drive-level bearing friction values at each of the predetermined cylinder position intervals using the computed torque values. In some embodiments, the drive-level bearing friction values are computed by subtracting the torque values at each of the predetermined cylinder position intervals for the actuator arm to move from the outermost cylinder position to the innermost cylinder position from the respective computed torque values at each of the predetermined cylinder position intervals for the actuator arm to move from the innermost cylinder position to the outermost cylinder position to obtain two times the drive-level bearing friction values to separate the torque associated with bearing friction from a printed circuit cable bias and windage forces experienced by the actuator arm during an operation of the disc drive. Then in this embodiment, the process further includes computing half the obtained two times the drive-level bearing friction values at each of the predetermined cylinder position intervals to compute the drive-level bearing friction values at each of the predetermined cylinder position intervals. The computation of the drive-level bearing friction values, are discussed in more detail in the detailed description of FIGS. 4 and 5.

The next step 640 includes computing an average drive-level bearing friction from the computed drive-level bearing friction values to determine the drive-level bearing friction of the disc drive. This is preferably computed as $$\frac{K_1}{2M}\sum_{i=1}^{M}(I_i - X_i) - \frac{K_2}{2N}\sum_{j=1}^{N}(I_j - X_j),$$

In this formula, M refers to the number of values measured in the inward-moving phase, $I_i$ refers to each current measured, and $X_i$ refers to an estimated offset to compensate for printed circuit cable bias and windage forces experienced by the actuator arm assembly at each corresponding one of the M primary cylinder positions. N refers to the number of values measured in the outward-moving phase, $I_j$ refers to each current measured, and $X_j$ refers to an estimated offset to compensate for printed circuit cable bias and windage forces experienced by the actuator arm assembly at each corresponding one of the N primary cylinder positions. $K_1$ and $K_2$ are constants. Preferably, the next step 650 includes characterizing the disc drive by comparing the computed average drive-level bearing friction with a predetermined drive-level bearing friction value.

Figure 7:
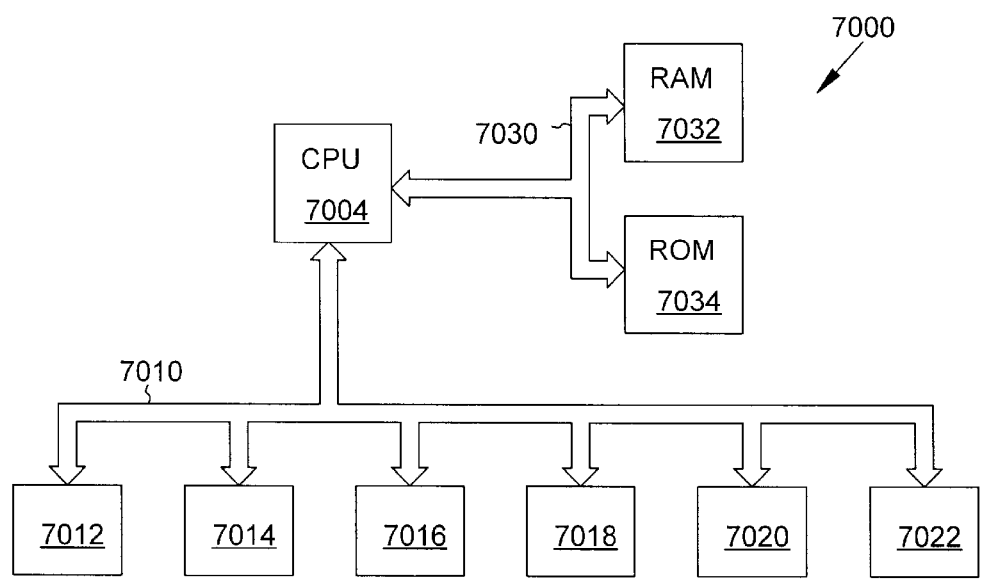
FIG. 7 is a schematic view of a computer system.

FIG. 7 is a schematic view of a computer system. Advantageously, the invention is well suited for use in a computer system 700. The computer system 700 may also be called an electronic system or an information handling system and includes a central processing unit, a memory and a system bus. The information handling system includes a central processing unit 704, a random access memory 732, and a system bus 730 for communicatively coupling the central processing unit 504 and the random access memory 732. The information handling system 702 may also include an input/output bus 710 and several peripheral devices, such as 712, 714, 716, 718, 720, and 722 may be attached to the input output bus 710. Peripheral devices may include hard disc drives, magneto-optical drives, floppy disc drives, monitors, keyboards and other such peripherals. Any type of disc drive can be characterized by measuring drive-level bearing friction using the system and method described above.

CONCLUSION

In conclusion, a disc drive 100 includes a base 112 and a disc 134 rotatably attached to the base 112. The disc drive 100 also includes a shaft 118 attached to the base. A bearing cartridge 116 is disposed in the base 112. An actuator arm assembly 120 is attached to the shaft 118 via the bearing cartridge 116 such that the actuator arm assembly 120 is in an actuating relationship with respect to the disc 134. The disc drive 100 further includes a voice coil motor. The voice coil motor is coupled to the actuator arm to position the actuator arm assembly 150 over the rotating disc 134 during track follow-and-seek operations of the disc drive 100. The voice coil motor is coupled to a disc drive controller 200. The disc drive controller 200 includes a servo controller 210, an analyzer 220, a comparator 230, and a memory 240.

The servo controller 210 through the voice coil motor, moves the actuator arm assembly 120 to predetermined cylinder position intervals 270 from an outermost cylinder position 250 to an innermost cylinder position 260 on the rotating disc 134. Then the servo controller 210 measures the voice coil motor current required to move the actuator arm assembly 120 to each of the predetermined cylinder position intervals 270. Then the servo controller 210 further moves the actuator arm assembly 120 to the predetermined cylinder position intervals 270 from the innermost cylinder position 260 to the outermost cylinder position 250 on the rotating disc 134. Then the servo controller 210 again measures the voice coil motor current required to move the actuator arm assembly 150 to each of the predetermined cylinder position intervals 270.

Then the analyzer 220 computes torque values required to move the actuator arm assembly 120 to each of the predetermined cylinder position intervals 270 using the measured voice coil motor currents. Then the analyzer 220 computes drive-level bearing friction values to move the actuator arm assembly 120 to each of the predetermined cylinder position intervals 270 using the computed torque values. The analyzer 220 further computes an average drive-level bearing friction value from the computed drive-level bearing friction values to determine the drive-level bearing friction of the disc drive. The comparator 230 coupled to the analyzer 220 compares the determined drive-level bearing friction with a predetermined drive-level bearing friction value to characterize the disc drive 100.

Also, discussed is a method 600 of measuring drive-level bearing friction and characterizing the disc drive using the measured drive-level bearing friction. The method begins with the step 610 of measuring voice coil motor current values for moving an actuator arm assembly from an outermost cylinder position to each predetermined cylinder position interval until the actuator arm assembly reaches the innermost cylinder position. The method further requires measuring voice coil motor current values for moving the actuator arm assembly from the innermost cylinder position to each of the predetermined cylinder intervals until the actuator arm assembly reaches the outermost cylinder position.

Next, the method 600 comprises the step 620 of computing the torque values required to move the actuator arm assembly to each of the predetermined cylinder position intervals from the measured voice coil motor currents. Then the method requires computing drive-level bearing friction values using the computed torque values. Steps 630 and 640 compute an average drive-level bearing friction from the computed drive-level bearing friction values to determine the drive-level bearing friction of the disc drive. Next, the method 600 includes the step 650 of comparing the determined average drive-level bearing friction to a predetermined drive-level bearing friction to characterize the disc drive.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of evaluating bearing friction in a hard disc drive assembly (HDDA), comprising steps of:
    (a) measuring several first voice coil motor (VCM) current values while moving an actuator arm assembly from a primary cylinder position inward to at least one successive cylinder position;
    (b) measuring several second VCM current values while moving the actuator arm assembly from a secondary cylinder position outward to at least one successive cylinder position; and
    (c) arithmetically combining the first and second VCM current values to generate an indication of the drive-level bearing friction.

2. The method of claim 1, further comprising:

(d) comparing the determined drive-level bearing friction to a predetermined threshold value to characterize the HDDA.

3. The method of claim 2, further comprising:

(e) re-working the HDDA if the indication has a magnitude greater than the predetermined threshold value, and otherwise generally not re-working the HDDA.

4. The method of claim 1 in which the HDDA has a total number C of cylinder positions, and in which the measuring step (a) comprises a step (a1) of positioning the actuator arm assembly at one of the outermost C/20 of the C cylinder positions.

5. The method of claim 1 in which the HDDA has a total number C of cylinder positions, and in which the measuring step (a) comprises a step (a1) of positioning the actuator arm assembly at one of the innermost C/20 of the C cylinder positions.

6. The method of claim 1 in which the HDDA has a total number C of cylinder positions, and in which the measuring step (b) comprises a step (b1) of positioning the actuator arm assembly at one of the innermost C/20 of the C cylinder positions.

7. The method of claim 1 in which the measuring step (a) includes fewer than 100 iterated steps of moving the actuator arm assembly to one of the successive cylinder positions, each iterated step of moving performed to realize a respective predetermined cylinder position interval.

8. The method of claim 1 in which combining step (c) includes a step of calculating the indication as $$\frac{K_1}{2M}\sum_{i=1}^{M}(I_i - X_i) - \frac{K_2}{2N}\sum_{i=1}^{N}(I_j - X_j),$$

where

M refers to the number of values measured in the measuring step (a), $I_i$ refers to each current measured in the measuring step (a), $X_i$ refers to an estimated offset to compensate for printed circuit cable bias and windage forces experienced by the actuator arm assembly at each corresponding one of the M primary cylinder positions, N refers to the number of values measured in the measuring step (b), $I_j$ refers to each current measured in the measuring step (b), $X_j$ refers to an estimated offset to compensate for printed circuit cable bias and windage forces experienced by the actuator arm assembly at each corresponding one of the N primary cylinder positions, and $K_1$ and $K_2$ are constants.

9. A disc drive, comprising:

a base;

a rotating disc attached to the base;

a shaft attached to the base;

a bearing cartridge including one or more ball bearings disposed in the base;

an actuator arm assembly, attached to the shaft via the bearing cartridge such that the actuator arm assembly is in an actuating relationship with respect to the rotating disc;

a voice coil motor, coupled to the actuator arm assembly, to position the actuator arm assembly over the rotating disc during track follow-and-seek operations;

a disc drive controller, coupled to the voice coil motor, further comprises:

a servo controller, coupled to the voice coil motor, moves the actuator arm assembly to predetermined cylinder position intervals from an outermost cylinder position to an innermost cylinder position on the rotating disc and measures the voice coil motor current required to move the actuator arm assembly to each of the predetermined cylinder position intervals, further the servo controller moves the actuator arm assembly to the predetermined cylinder position intervals from the innermost cylinder position to the outermost cylinder position on the rotating disc and measures the voice coil motor current required to move the actuator arm assembly to each of the predetermined cylinder position intervals; and an analyzer, coupled to the servo controller, computes torque values required to move the actuator arm assembly to each of the predetermined cylinder position intervals using the measured voice coil motor currents, wherein the analyzer further computes drive-level bearing friction values using the computed torque values, wherein the analyzer further computes an average drive-level bearing friction value from the computed drive-level bearing friction values to determine the drive-level bearing friction of the disc drive.

10. The disc drive of claim 9, further comprising:

a comparator, coupled to the analyzer, to compare the determined drive-level bearing friction with a predetermined drive-level bearing friction value to characterize the disc drive.

11. The disc drive of claim 9, wherein the servo controller measures the voice coil motor current required to move the actuator arm assembly to the outermost and innermost cylinder positions on the rotating disc of the disc drive.

12. The disc drive of claim 9, wherein the predetermined cylinder position intervals are not more than 100 cylinder positions on the rotating disc of the disc drive.

13. The disc drive of claim 9, wherein the analyzer computes torque values by multiplying the measured voice coil motor current values with a predetermined torque constant.

14. The disc drive of claim 13, wherein the analyzer computes drive-level friction values by subtracting the computed torque values at each of the predetermined cylinder position intervals for the actuator arm assembly to move from the outermost cylinder position to the innermost cylinder position with the respective computed torque values at each of the predetermined cylinder position intervals for the actuator arm assembly to move from the innermost cylinder position to the outermost cylinder position to obtain two times the drive-level bearing friction values at each of the predetermined cylinder position intervals and to remove torque associated with overcoming printed circuit cable bias and windage forces experienced by the actuator arm assembly during the operation of the disc drive.

15. The disc drive of claim 14, wherein the analyzer further computes half the obtained two times the drive-level bearing friction values to determine drive-level bearing friction at each of the predetermined cylinder position intervals.

16. The disc drive of claim 15, further comprising:
a memory, coupled to the analyzer, to store the torque constant and the predetermined cylinder position intervals.

17. A disc drive, comprising:
a base;
a rotating disc attached to the base;
an actuator arm assembly attached to the base such that the actuator arm assembly is in an actuating relationship with respect to the rotating disc;
a voice coil motor coupled to the actuator arm assembly to position the actuator arm assembly over the rotating disc during track follow-and-seek operations;
a disc drive controller coupled to the voice coil motor comprising:
a servo controller, coupled to the voice coil motor, moves the actuator arm assembly during track follow-and-seek operations of the disc drive; and
means for determining drive-level bearing friction to move the actuator arm assembly during the track follow-and-seek operations of the disc drive to indicate a composite bearing friction of the disc drive.

* * * * *